July 20, 1948.  C. W. VOGT  2,445,701
MANUFACTURE OF TIRES
Filed March 1, 1944  2 Sheets-Sheet 1
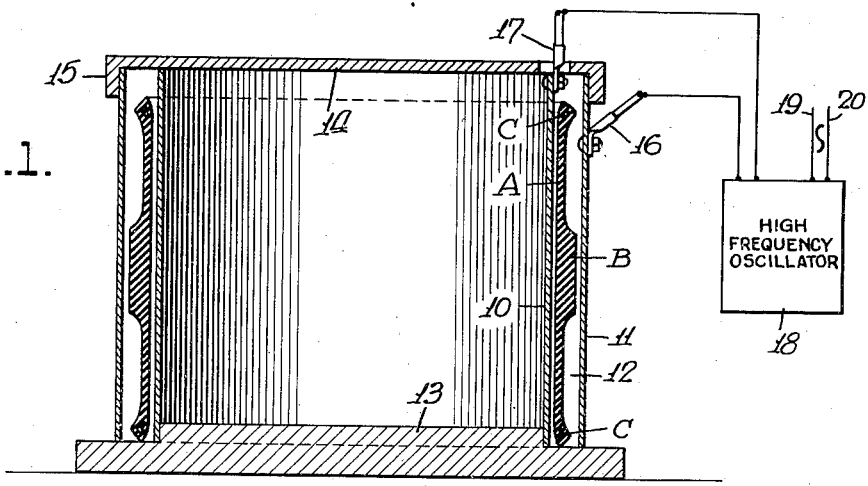
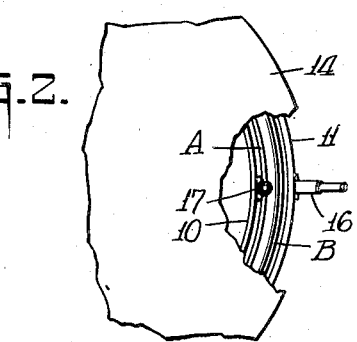
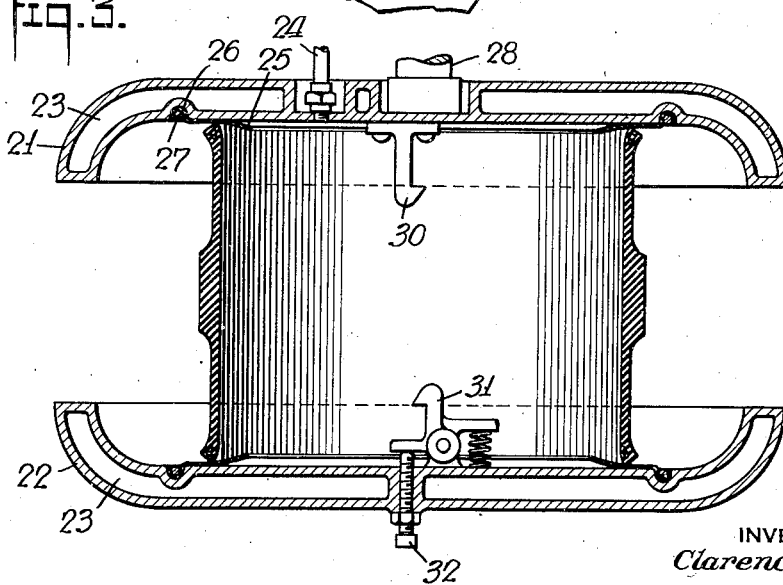
INVENTOR
Clarence W. Vogt
BY
Dean Fairbank & Hirsch
ATTORNEYS

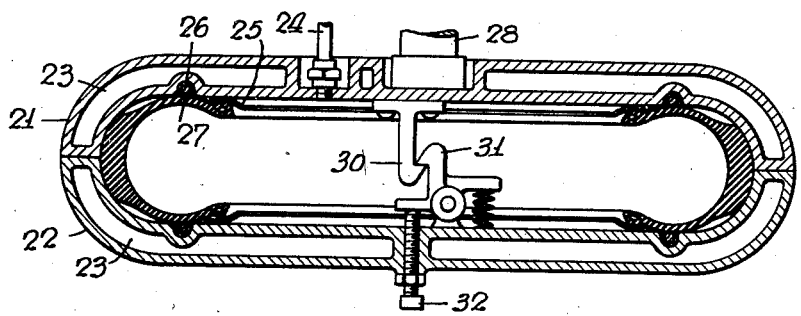
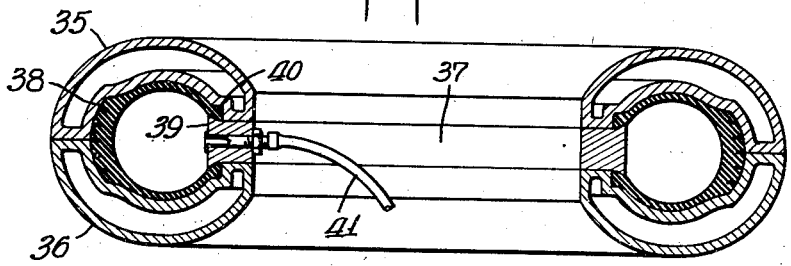
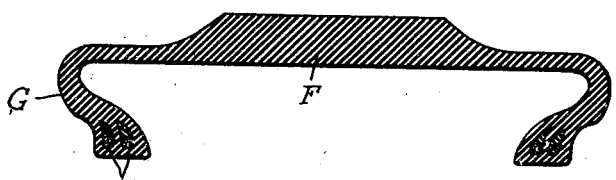
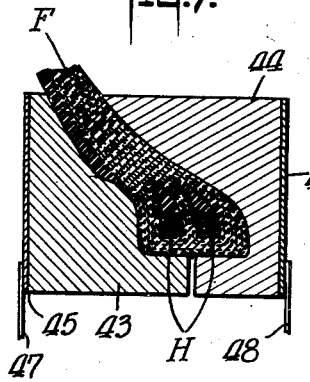
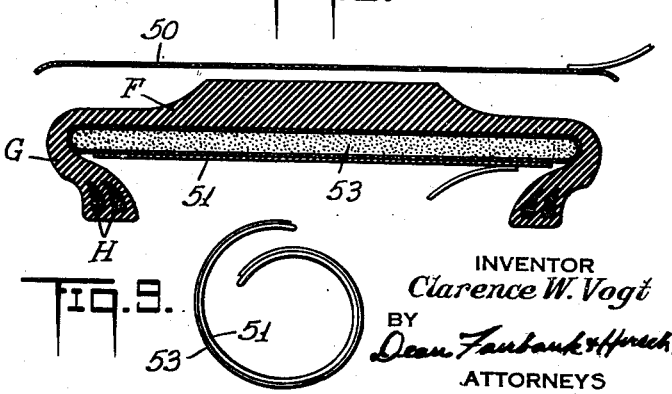

Patented July 20, 1948

2,445,701

UNITED STATES PATENT OFFICE 2,445,701

MANUFACTURE OF TIRES

Clarence W. Vogt, Norwalk, Conn.

Application March 1, 1944, Serial No. 524,537

19 Claims. (Cl. 18—53)

In the manufacture of pneumatic tires a procedure commonly employed is to build up a cylindrical band of fabric and unvulcanized rubber, with the opposite edges of the band so formed with metal reinforcing elements as to constitute the non-stretchable bead portions of the tire. The threads of the fabric are disposed diagonally so that the body portion of the band between the bead portions may be moved radially to a far larger diameter, and to varying degrees, to reform or mold the band to the desired shape for the tread and side walls of the tire. This molding or reforming may be considered as stretching, although the threads themselves do necessarily elongate.

For effecting the stretching there is commonly employed an expansible tube which is placed within the cylindrical band intermediate of the ends of the latter, and inflated to increase its diameter and stretch the wall of the band. The stretching may also be effected or facilitated by the application of a partial vacuum at the outer surface of the band. By this stretching, and the outward radial movement of the portion of the band between the edges, the said edges are brought toward each other, thereby converting the band into the approximate shape of the tire. This operation is effected while the rubber applied to and carried by the fabric is in an unvulcanized state.

Unvulcanized rubber is very much softer when heated, provided the heating is not carried to the point where vulcanization is effected. Therefore, the threads of the fabric may be more easily and effectively shifted in position in molding the tire when the rubber thereon is softer, but so far as I am advised, it has never been considered practical to soften the unvulcanized rubber on the band by heating prior to such stretching.

One probable reason why such preheating has not been considered practical is that all commercial tire curing has been by conduction, whereby several hours' time is required to heat the center or inner part of a tire section to reach a curing temperature, even when the impressed outer temperature is of the permissible maximum. For example, a 9 x 16 tire is approximately 1½ inches in thickness at its tread portion, and if an impressed temperature of 260° F. be used on the outer surface for vulcanizing, approximately several hours' time would be required to bring the inner portion of tread, which is farthest from the source of heat, to a temperature of 220° F. Therefore, the outer portion of the tread, which is closer to the source of heat, reaches a state of permanent cure long before the inner portion has been heated up to the curing temperature. If higher impressed temperature is applied, the time of heating and curing is reduced in proportion, but there is danger of overheating the outer surface portion.

It is considered standard practice of some tire manufacturers to maintain an average curing temperature of 260° F. for at least 20 minutes in the innermost portion of the tire, which is farthest from the source of heat. A longer time is required to effect complete vulcanization, if the maintained temperatures be below 260° F. However, while it is possible to raise the surface temperatures of tires at the rate of 20° per minute, the temperature difference between the mold and the rubber is more than 30° F. It is not possible to obtain any such substantial rises by conduction to points further removed from the heating surface. Also, by the use of impressed temperatures, it is impractical to operate at mold temperatures in excess of 310° F., since some of the ingredients of the rubber mix are irreparably damaged or charred above such temperatures.

As an important feature of my invention, I heat the band before stretching, and under controlled conditions whereby a temperature is obtained below, or in the lower portion of the vulcanizing temperature, which is usually between 220° F. and 310° F., and this temperature is produced substantially uniformly throughout the thickness of the band, regardless of variations in thickness of the latter.

In carrying out this feature of my invention, the band is disposed between a pair of spaced, substantially cylindrical or sleeve-like electrodes, one disposed inside of the band and the other outside thereof, and a high frequency electrostatic field is developed between the electrodes, and within the band, to effect the desired heating and softening of the unvulcanized rubber.

Due to the fact that rubber is a comparatively poor heat conductor, such uniform heating cannot be effected by the use of a heating element from which heat is radiated to the band, but by the use of a high frequency electrostatic field, the heat is produced in the band and the band is uniformly heated throughout.

I have found that it is readily possible to raise the temperature uniformly throughout the cross-section of the rubber band both at the thick as well as the thinner cross-section areas at a rate of 20° F. or more per minute, employing a high frequency electrostatic field. Thus, a tire carcass or band at a factory room temperature of say, 80° F. and prior to stretching, can be raised to the curing temperature range or to about 220° F. in seven minutes, and at this same rate, the band can be brought to 260° F. in two additional minutes.

In carrying out my improved process, the band is removed from the electrostatic field as soon as it has reached approximately 260° F., and after the tire has thus been in the curing range for only two minutes. By reason of the poor heat conductivity of the rubber, the band when heated to the desired extent, and with the unvulcanized rubber in a soft condition, may be removed from between the electrodes, and the stretching effected before the rubber has appreciably cooled, and while it remains soft. Approximately one additional minute may be required to stretch the band with the hot soft rubber thereon, into a shape resembling substantially the final form of the tire, and another minute may be required to clamp this stretched and formed band in a permanent mold and apply sufficient pressure to force the softened rubber to take on the proper tread form. The tire has thus reached and been enclosed in the final mold in not over four minutes from the time it entered the curing temperature range. This is only a small part of the twenty-five minutes usually required for the desired curing time of twenty-five minutes at 260° F. The final mold is preferably heated prior to the insertion of the stretched band, to the maximum temperature which it is safe to impress upon the outside surface of the tire without producing heat brittleness of the outer surfaces. The tire is then confined in this mold under the desired pressure and held at the curing temperature until the complete cure has been effected. The interior portion of the tire may rise in temperature by as much as 10° during the twenty minutes it is held in the final mold.

Assuming the tire is held in the mold for twenty minutes, it will be noted that by the use of my improved method, the hourly production per mold will be greatly increased over that now possible. These molding machines, particularly in the case of the larger size tires, represent expensive equipment and also require valuable factory space.

The stretching or forming apparatus may be heated to or above the temperature of the rubber in order to prevent any cooling of the band during this operation. Substantially less power is required in the forming of the softened rubber as compared to the power required to stretch the same rubber at room temperature, and furthermore, there is less tendency on the part of the heated rubber to spring back to its previous relatively cylindrical shape.

Presence of any bubbles or porosity caused by evolvement of gases during the several minutes of time in which the heated carcass or band has remained in the curing range at substantially atmospheric pressure is overcome by the subsequent pressure applied to the tire carcass after it has been placed in the final mold. This pressure can be readily brought up sufficiently high to cause the reabsorption of any gases which have emanated during this short period. It is assumed that these gases would be primarily free of uncombined sulphur and since the amount of absorption of such is in a direct ratio to the pressure, this somewhat belated imposition of the pressure will at once cause a reabsorption of these gases and the closing of the voids caused by their emission, and since the pressure is maintained until the complete cure has been effected, the resulting structure of the carcass is one that is substantially free of all porosity, since this pressure is applied in the earliest stages of the cure and long before much, if any, of the gases have been given off.

While I have used the temperatures of 260° F. in the foregoing examples, it will be understood that this is by way of instance only, and it is very obvious that some operators or manufacturers may prefer to maintain the preliminary internal or electrostatic preheating below or at a lower point in the vulcanizing band, and other manufacturers may prefer to carry on this preheating to a higher point in the curing band. This would be particularly true with synthetic mixes or other mixes in which there is little or no escape of gases such as free sulphur or in mixes where these gases are given off at a relatively slow rate.

My invention may be employed for tires made from a tire band which has a substantially cylindrical body portion. If there be a single nest of bead wires at each edge of the band, the entire band is substantially cylindrical. Standard practice with some tire manufacturers is to use multiple nests or clusters of bead wires, particularly in tires of over eight plies. In such tires the body portion of the band is also substantially cylindrical, even though it has marginal flanges to form the beads and in order that both the clusters of bead wires be of relatively the same diameter in the finished tire.

As a further feature of my invention where tires of this construction are to be made, I prefer to substantially cure the bead sections prior to the preforming of the remainder of the carcass. By means of such procedure, a more uniform bead contour is assured and there is a further advantage in that the tire may be clamped in the final mold, and a portion of the band between the beads may be stretched to the desired form without stretching or flowing or distorting of the bead section during such stretching of body of band or during curing of the main body of the carcass. A further advantage resides in the elimination of the curing tubes due to the fact that the precured bead sections permit a tighter clamping than these sections could successfully withstand prior to curing. One of the main reasons for the use of curing tubes resides in the fact that it has been impractical to maintain uniform bead sections where the complete tire is cured at one time and by the application of a fluid pressure, in direct contact with the inner surface of the band or carcass. This direct pressure permits a free flow of uncured rubber to and from various portions of the bead, thereby causing a non-standard size of bead. The presence of a relatively thick section of rubber in the curing bag reduces this undesirable flow of rubber due to the contact of the outside surfaces of the tube with the inside surface of the tire carcass. However, where these bead sections have been previously cured, there is no flow of uncured rubber away from these sections during the subsequent curing of the remainder of the carcass. Again it has not been practical to manufacture tires by the use of impressed heat in two stages and acting on first the bead sections and then the band of the carcass. Obviously, during the time required to impress by conduction, the heat throughout the relatively thick sections of the bead, some of this heat would flow out toward the body portion of the carcass, which would then be partially cured free from pressure and prior to shaping of the tire. However, by rapidly bringing the temperature of the bead sections up to the curing temperature, complete cures can be effected in the bead sections without the undesirable dissipation of heat upward or outward into the carcass.

For example, the bead sections may be brought to a temperature of 300° F. within a matter of four or five minutes and then by cutting off the high frequency field, there is no further inflow of heat to any part of the bead surfaces. Tendency for heat from bead sections to flow outward into unclamped portion of bead can be minimized by a flow of jets of cool air against these unclamped portions and is further minimized where the electrodes are of relatively thin metal backed up by insulating supports of a substantially low heat content.

My invention may be utilized in apparatus having various different details of construction and arrangements of parts. Therefore, the particular forms hereinafter described are to be considered only as illustrative of simple forms of apparatus which may be used for carrying out the invention. In the drawings:

Fig. 1 shows a tire band disposed between two annular electrodes for the preheating and softening of the unvulcanized rubber.

Fig. 2 is a top view of a portion of the apparatus shown in Fig. 1, a top portion in the vicinity of the electrode connections being broken away.

Fig. 3 shows a simple apparatus in which the preheated band may be placed for stretching the band to the approximate shape desired for the tire.

Fig. 4 shows the position of the parts shown in Fig. 2 after the initial stretching.

Fig. 5 shows a second form of mold in which the final stretching is effected to form the desired tread design.

Fig. 6 shows a section through a tire band having dual wire clusters in the beads.

Fig. 7 shows a section through the bead portion of the band shown in Fig. 6, and with electrodes applied for selectively curing said bead portion, Fig. 8 shows the body of the band of Fig. 6 between a pair of electrodes for selective preheating of the body of the band prior to stretching, and Fig. 9 is a small scale view of the inner collapsible electrode.

Where the band contains a single wire cluster in each bead portion, the band may be made in the usual manner, and includes a substantially cylindrical body A having fabric layers and unvulcanized rubber applied thereto and with a larger amount at the middle portion B so as to give greater thickness at the tread portion of the tire. In the edge portions of the band are incorporated wire clusters C or other suitable non-stretchable elements.

The band, after being completed, is inserted between a pair of substantially cylindrical concentric electrodes 10 and 11, which are of such relative diameters as to leave an annular heating space 12 into which the band may be inserted and which may be held in any suitable form of supports. The apparatus is shown as having a base portion 13 of suitable non-conducting material, and preferably having a raised central portion so as to hold the inner electrode in predetermined position. The apparatus may have a cover section 14 provided with a flange 15 for engaging the outer electrode and holding the latter concentric with the inner electrode.

Conductors 16 and 17 may be connected to any suitable source of high frequency alternating current which is of such a character as will produce between the two electrodes 10 and 11 a high frequency electrostatic field of sufficient heating effect to raise the temperature of the band to the desired temperature in a very short period of time. I have shown the conductors 16 and 17 connected to opposite terminals of a high frequency oscillator 18 which may receive alternating current through lead lines 19 and 20. The details of the high frequency oscillator form no portion of my invention, and may be of the character commonly employed for producing high frequency electrostatic fields for plywood manufacture and other heating purposes.

The heating in the band may be such as will raise the temperature substantially uniformly throughout the body thereof to the lower limit of or slightly within the vulcanizing range. This may be in the neighborhood of about 220° F. The heat softens the rubber to the point where it offers very little resistance to the stretching of the band to tire form, but obviously should not be continued for a sufficient length of time to cause any substantial vulcanization of the rubber, as that would retard rather than facilitate the stretching.

By using the high frequency electrostatic field, the material throughout the interior of the band will be heated to the same temperature as the outer surface, because the heat is developed within the band being heated, rather than conducted thereto from the electrodes. Thus, there is no overheating of the surface such as might cause case hardening or "heat brittleness." When the band has been uniformly heated to the desired temperature, which requires only a very short period of time, the band is put into a suitable stretching apparatus whereby the portions of the band between the beads are expanded radially, and the band converted to approximately the shape of the desired tire. By reason of the preheating and softening of the unvulcanized rubber, this stretching may be easily accomplished with the minimum application of force, and in a very short time.

In Figs. 3 and 4 I have shown a simple apparatus in which this stretching may be effected. This apparatus comprises a tire mold formed of two sections 21 and 22, each having double walls so as to provide chambers 23 for steam or other heating fluid which will raise the sections to approximately the temperature of the band before or at the time the band is placed between the sections, as shown in Fig. 3. The stretching may be effected by air, carbon dioxide, nitrogen, steam or other heating fluid delivered under pressure through a pipe 24 to the chamber which is formed by the two mold sections and the tire band. Means are provided to prevent escape of the pressure fluid from between the edges of the band and the surfaces of the two mold sections, and to permit rotational movement of the bead sections to the proper position for forming the tire. As shown, each section has an annular resilient strip 25 on its inner surface and with which the bead edges of the band may engage. These strips may be held in place in any suitable manner, as for instance by having curved edges seated in grooves 26, and held therein by retainers 27.

To prevent the possibility of the pressure fluid from entering the band or channeling through any possible pores in it, the inner surface of the latter may be swabbed, coated or otherwise treated with any suitable sealing compound, or covered with a thin layer of pliofilm, butyl rubber, or other similar stretchable, impervious sheet material.

The two mold sections 21 and 22 may be forced toward each other in any suitable manner, as for instance by a plunger 28 connected to a hydraulic press, and this relative movement of the two sections should be coordinated with the delivery of the pressure fluid through the pipe 24, so that the band rapidly stretches at its intermediate portion while remaining in sealing engagement with the mold sections until the parts assume the position shown in Fig. 4. If desired, the two mold sections may have suitable means for locking them together when they reach closed position, and to hold them there while the mold and tire carcass are moved to the proper location for the next successive operation. As illustrated, the mold section 22 is provided with a hook 30, and the mold section 21 is provided with a spring catch 31, which will automatically interlock when the mold sections reach closed position. To release the catch when it is desired to open the mold, any suitable means may be employed, as for instance a screw bolt or plunger 32, which forms a substantially gastight joint with its mold section.

Although the band is shown as brought to approximately the desired tire shape by mold sections shown in Figs. 3 and 4, it will be obvious that so far as certain aspects of the invention are concerned, this preliminary shaping of the tire may be effected by any other type of apparatus commonly employed in the industry.

After the tire has been brought to the approximate shape desired, it is removed from the mold above described, and placed in a second mold where internal pressure is applied to the tire to further stretch the wall and to force the tread and walls to the exact shape desired; to form on the tread the desired non-skid or road gripping design, conformation, or pattern, and to hold the rubber under pressure so as to prevent the development of highly undesirable porosity due to formation of gases within the rubber.

In Fig. 5 there is shown a mold suitable for this purpose. This includes three sections, of which the two sections 35 and 36 may have heating means such as double walls for receiving steam or other heating fluid for the vulcanizing of the tire. The third section 37 serves for spacing apart the two sections 35 and 36 at the inner periphery and for clamping the tire beads. The inner surface of the mold sections 35 and 36 are provided with suitable projections and depressions 38, so that when the tire is stretched to final form within the mold, the softened rubber on the tread portion will be forced out radially into engagement with such projections and depressions to form the desired tread design on the tire. The periphery of the spacer section 37 projects to a short distance into the tire, and has a head portion 39 flaring outwardly and disposed within an annular recess 40 formed by the two mold sections 35 and 36, so as to form a pair of bead receiving channels.

In assembling the tire carcass and mold, the inner section 37 is placed with its peripheral portion between the beads of the tire, and in closing the mold such bead sections are firmly clamped in the recess 40 by the head portion 39. Thus the beads may be held against outward radial movement, so that the further stretching of the tire is outwardly from the clamped bead portions. As the inner surface of the uncured tire carcass has been coated or covered to render it impervious, the stretching may be effected by delivering steam, hot air, or other suitable fluid medium through a pipe 41 extending radially through the inner section 37. After this final stretching of the tire wall and the formation of the tread design thereon, the tire is held in the mold while the heating is continued by the action of steam or other heating medium in the chambers of the mold. As the rubber of the carcass was previously heated up to approximately the vulcanizing temperature in the apparatus shown in Figs. 1 and 2, and as such heating was substantially uniform throughout the thickness of the wall of the carcass, the final vulcanization of the tire in the mold may be effected in very much less time than is ordinarily required, and a very much larger number of tires may be produced from a single mold in a day or other given time period.

As a further feature of the invention, I may and preferably do selectively vulcanize the bead portions of the tire prior to the vulcanizing of the body portion of the tire, so that the bead portions will be of definite and predetermined shape, and may be tightly clamped in the mold during the stretching of the body of the band, and without danger of flow of rubber toward or from the bead portions during the stretching. This selective vulcanizing of the bead portions may be employed for tires having a single wire cluster in each bead, but is particularly desirable for larger, heavier tires, where there are dual wire clusters in each bead.

Where the tire is to have dual wire clusters in the beads, the band cannot be formed as a simple cylindrical one, but is ordinarily formed of substantially the shape shown in Fig. 6. This may be considered as a cylindrical band F with inturned side edge portions G, with the dual clusters of bead wires H of substantially the same diameter.

In Fig. 7 there is shown an apparatus which may be employed for selectively vulcanizing the bead portions by the use of a high frequency electrostatic field. As shown, there is employed a pair of annular mold parts 43 and 44 with their opposed surfaces conforming to the desired cross-sectional form of the beads of the tire. If desired, the outer mold part 43 may be formed of a single rigid member, as it may be moved endwise into and out of position. The inner mold part 44 may be made of flexible material with separable ends or may be made of separable sections so as to facilitate the insertion and removal and to permit radial movement to press the bead portion of the tire between the mold sections, and give them the desired pressure and shape. They may be of any suitable dielectric material.

In connection with the mold sections, there are employed annular flat electrode plates 45 and 46 which may be secured to or incorporated in said sections. These have connections 47 and 48 to opposite terminals of a high frequency oscillating current source and the desired electrostatic heating field developed therebetween. The rubber within the bead portions will be vulcanized to the desired degree, but the heating effect produced in the field will not extend to any appreciable distance along the wall of the tire which extends out from between the molds. The projecting portions of the wall may be kept cool and below the vulcanizing temperature by air streams directed toward such portions, if necessary.

When the bead sections have thus been vulcanized in their desired final shape and form, they may be effectively clamped in position by any suitable means such as that shown in Fig. 5, during the stretching of the body portion of the wall and during the vulcanizing of the tire.

Either before or after the bead portions of the tire have been selectively vulcanized, the main wall of the band may be heated in a high frequency electrostatic field to soften the rubber and facilitate the stretching of said wall. In Figs. 8 and 9 the body portion of the band is shown between electrode plates whereby said body portion of the band may be heated in an electrostatic field after the vulcanization of the bead portions. This includes an outer cylindrical electrode 50 and an inner electrode 51 which may be connected to the terminals of a suitable source of high frequency alternating electric current. The outer electrode may be of one piece and rigid, but the inner electrode 51 is so formed that it may be inserted between the beads and moved outward radially and brought adjacent to the inner surface of the wall of the tire. This electrode may be a flexible metal plate and may carry an outer thin quilted sand bag 53 forming a dielectric, so that it may be collapsed as shown in Fig. 9, inserted in place, and expanded to bring the ends into abutting relationship. They may be made up of sections hinged or otherwise connected, so as to facilitate the proper positioning of the electrodes in respect to the surfaces of the band. The two electrodes 50 and 51, when in position, are thus appropriately curved to approximately follow the contour of the outer and inner surfaces of the wall, and are substantially parallel at all portions of the electrostatic field.

In order that all of the rubber of the tire be properly vulcanized, it is preferable that in the selective vulcanizing of the bead portion and the remainder of the tire, there be a slight overlap of the vulcanizing or curing steps, as such overlapping is not injurious, and by vulcanizing in a high frequency field, the high heat is produced for only a few minutes, as compared to several hours in the present day processes.

If the internal electrode be made segmental with a central part and peripheral hinged sections, so that it may be opened up like an umbrella, the central portion of the band may be expanded to approximately final diameter after removal of the outer electrode, and while folding down the hinged sections of the electrode. Then, after placing the expanded band into the bottom half of a final curing or vulcanizing mold, the inner sectional electrode may be withdrawn and the top half of the mold clamped on and fluid pressure applied. In this way, the use of the shaping mold shown in Figs. 3 and 4 may be unnecessary, as the band, when heated, is very soft and easily formable, and the vulcanized bead portions may be clamped and retain their shape.

The forms of apparatus illustrated and above described are given merely as examples, as various changes may be made in the details thereof without departing from the scope of the invention.

Having thus described my invention, what I claim as new and desire to secure by Letters Patent is:

1. In the process of making tires, the steps of forming a band of fabric and unvulcanized rubber, heating the intermediate body portion of said band in a high frequency electrostatic field to a temperature not substantially exceeding the lower limit of the vulcanizing range of the rubber to soften the latter, while maintaining said body portion substantially free from externally applied pressure, and thereafter stretching the heated unvulcanized band to tire shape.

2. In the process of making tires, the step of forming a band of fabric and unvulcanized rubber layers, softening the rubber in the intermediate body portion of the band by heating in a high frequency electrostatic field to a temperature of about 220° F., while maintaining said body portion substantially free from externally applied pressure, and thereafter stretching the band while hot substantially to tire form.

3. In the process of making tires, the steps of heating the intermediate body portion of a band of fabric and unvulcanized rubber in a high frequency electrostatic field to a temperature not substantially above the lower limit for vulcanizing of said rubber, while maintaining said body portion substantially free from externally applied pressure, and thereafter stretching the heated and softened band substantially to tire shape by the application of fluid pressure to the interior of the band.

4. The process of making tires which includes heating a band of rubber and fabric in a high frequency electrostatic field to a temperature not substantially exceeding the lower limit for vulcanizing the rubber to soften the latter, and thereafter applying fluid under pressure directly to the inner surface of the band to stretch the body thereof, while sealing the edges of the band against escape of pressure fluid along said edges.

5. The process of making tires which includes forming a band of rubber and fabric having reinforced bead portions, vulcanizing said bead portions in a high frequency electrostatic field, while maintaining the intermediate body portion of said band between said bead portions unvulcanized, clamping the vulcanized bead portions and thereafter stretching said unvulcanized body portion to the desired tire form, while maintaining said bead portions clamped.

6. The process of making tires which includes forming a band of rubber and fabric having reinforced bead portions, vulcanizing said bead portions in a high frequency electrostatic field, while maintaining the intermediate body portion of said band between said bead portions unvulcanized, then softening the rubber in said body portion in a high frequency electrostatic field and thereafter stretching the heated band to tire shape.

7. The process of making a tire from a band formed of rubber and fabric and having bead portions which includes vulcanizing said bead portions, while maintaining the intermediate body portion of said band between said bead portions unvulcanized, and thereafter stretching said body portion to tire form, while subjecting said body portion to vulcanizing heat.

8. The process of making a tire from a band formed of rubber and fabric and having bead portions which includes vulcanizing said bead portions by heating said bead portions in a high frequency electrostatic field, while maintaining the intermediate body portion of said band between said bead portions unvulcanized, and thereafter stretching said body portion to tire form, while subjecting said body portion to vulcanizing heat and pressure.

9. The process of making a tire from a band formed of rubber and fabric and having bead portions which includes vulcanizing said bead portions by heating said bead portions in a high frequency electrostatic field, while maintaining the intermediate body portion of said band between said bead portions unvulcanized, heating said body portion in a separate high frequency electrostatic field to soften the rubber thereof, and then stretching said body portion substantially to tire form, while subjecting said body portion to vulcanizing heat.

10. In the process of making tires, the steps of forming a band of fabric and unvulcanized rubber layers having a substantially cylindrical intermediate body portion, heating said body portion in a high frequency electrostatic field to a rubber softening temperature, while maintaining said body portion in substantially cylindrical shape and substantially free from externally applied pressure, and thereafter stretching and molding the heated band to tire shape by the action of pressure.

11. In the process of making tires, the steps of forming a band of fabric and unvulcanized rubber layers, heating the entire band in a high frequency electrostatic field to a rubber softening temperature, while maintaining said band substantially free from externally applied pressure, and thereafter stretching and molding the softened band to tire shape, while subjecting said band to pressure and to vulcanizing heat.

12. In the process of making tires, the steps of forming a band with reinforced bead portions and with layers of rubber and fabric, vulcanizing said bead portion in a high frequency electrostatic field, while maintaining the intermediate body portion of said band between said bead portions unvulcanized, subjecting said body portion to the rubber softening action of a high frequency electrostatic field, while maintaining said body portion substantially free from externally applied pressure, and thereafter stretching and molding the band to tire shape, while subjecting said body portion to vulcanizing heat, and while said vulcanized beaded portions are clamped.

13. In the process of making tires, the steps of forming a band with reinforced bead portions and with a substantially cylindrical body portion between said bead portions having layers of rubber and fabric, vulcanizing said bead portions, while maintaining said body portion unvulcanized, subjecting said body portion to the rubber softening action of a high frequency electrostatic field, while maintaining said body portion in substantially cylindrical shape and substantially free from externally applied pressure, and thereafter stretching and molding the band to tire shape, while maintaining the vulcanized bead portions clamped, and while subjecting said body portion to pressure and to vulcanizing heat.

14. In the process of making tires, the steps of inserting the intermediate body portion of a band formed of rubber and fabric layers between a pair of inner and outer annular electrodes, producing between said electrodes a high frequency electrostatic field of sufficient intensity to soften the rubber layers, but insufficient to vulcanize said layers, and thereafter stretching and molding the band in a separate tire mold, while subjecting said intermediate body portion to pressure and vulcanizing heat.

15. In the process of making tires, the steps of forming a band having an intermediate substantially cylindrical body portion with rubber and fabric layers, inserting said band between a pair of concentric cylindrical electrodes, producing between said electrodes a high frequency electrostatic field of sufficient intensity to soften the rubber layers, but insufficient to vulcanize said layers, while maintaining said body portion substantially free from externally applied pressure, and thereafter stretching the heated band substantially in the form of a tire in a separate stretching unit.

16. In the process of making tires, the steps of forming a band with reinforced bead portions and with layers of rubber and fabric, vulcanizing said bead portions, while maintaining the body portion between said bead portions unvulcanized, inserting said body portion between a pair of inner and outer annular high frequency electrostatic electrodes with the vulcanized head portions outside the electrostatic field produced between said electrodes, producing between said electrodes a high frequency electrostatic field of sufficient intensity to soften the rubber layers, but insufficient to vulcanize said layers, and thereafter stretching the heated band into substantially tire form by pressure action in a separate stretching unit, while clamping said beaded portions.

17. In the process of making tires, the steps of forming a band of fabric and unvulcanized rubber layers having a substantially cylindrical intermediate body portion, heating said body portion to a rubber softening temperature by the action of a high frequency electrostatic field, while maintaining said body portion in substantially cylindrical shape and substantially free from externally applied pressure, pressing the opposite ends of the heated band toward each other in a separate stretching unit, while applying fluid pressure to the inner side of said band, to cause said band to be stretched approximately into tire form, and stretching and molding in a separate molding unit the approximate tire into its final form, while subjecting said approximate tire to fluid pressure and vulcanizing heat.

18. In the process of making tires, the steps of forming a band with reinforced bead portions, vulcanizing said bead portions in a high frequency electrostatic field, while maintaining the intermediate body portion unvulcanized, and thereafter applying fluid under pressure directly to the inner surface of the unvulcanized body portion of the band to stretch said body portion, while clamping the vulcanized bead portions.

19. In the process of making tires, the steps of forming a band with reinforced bead portions, vulcanizing said bead portions in a high frequency electrostatic field, while maintaining the intermediate body portion unvulcanized, softening the rubber in said body portion in a high frequency electrostatic field, and thereafter applying fluid under pressure directly to the inner surface of said heated body portion to stretch said body portion, while clamping the vulcanized bead portions.

CLARENCE W. VOGT.

REFERENCES CITED

The following references are of record in the file of this patent:

UNITED STATES PATENTS

| Number | Name | Date |
| --- | --- | --- |
| 534,792 | Hardwick | Feb. 26, 1895 |
| 962,054 | Rowley et al. | June 21, 1910 |
| 1,226,236 | Meyer et al. | May 15, 1917 |
| 1,389,442 | De Mattia | Aug. 30, 1921 |
| 1,408,678 | Ayres | Mar. 7, 1922 |
| 2,221,470 | Brown | Nov. 12, 1940 |
| 2,280,771 | Dufour et al. | Apr. 28, 1942 |
| 2,307,344 | Zottu | Jan. 5, 1943 |
| 2,331,795 | McMahan | Oct. 12, 1943 |
| 2,339,607 | Smith | Jan. 18, 1944 |
| 2,354,446 | Brown | July 25, 1944 |